(12) United States Patent
Yamamoto

(10) Patent No.: US 11,212,417 B2
(45) Date of Patent: Dec. 28, 2021

(54) IMAGE PROCESSING APPARATUS THAT PROCESSES IMAGE DATA INCLUDING CODED IMAGE

(71) Applicant: KYOCERA Document Solutions Inc., Osaka (JP)

(72) Inventor: Yuki Yamamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/856,707

(22) Filed: Apr. 23, 2020

(65) Prior Publication Data

US 2020/0344382 A1 Oct. 29, 2020

(30) Foreign Application Priority Data

Apr. 26, 2019 (JP) .............................. JP2019-085158

(51) Int. Cl.
  *H04N 1/32* (2006.01)
  *G06F 3/12* (2006.01)
  *H04N 1/387* (2006.01)

(52) U.S. Cl.
  CPC ....... *H04N 1/32267* (2013.01); *G06F 3/1222* (2013.01); *G06F 3/1238* (2013.01); *H04N 1/32144* (2013.01); *H04N 1/32149* (2013.01); *H04N 1/3875* (2013.01)

(58) Field of Classification Search
  CPC combination set(s) only.
  See application file for complete search history.

(56) References Cited

U.S. PATENT DOCUMENTS

| 7,280,238 | B2* | 10/2007 | Akiyoshi | .............. G06F 21/608 |
| | | | | 358/1.14 |
| 7,287,698 | B2 | 10/2007 | Barrus | ...................... 235/462.15 |
| 2005/0194448 | A1* | 9/2005 | Dusio | ..................... H04L 67/14 |
| | | | | 235/472.02 |
| 2005/0286076 | A1 | 12/2005 | Cho | ............................. 358/1.15 |
| 2007/0158425 | A1 | 7/2007 | Matsuura | ................. 235/462.13 |
| 2007/0246542 | A1 | 10/2007 | Manheim | ....................... 235/487 |
| 2009/0284775 | A1 | 11/2009 | Muramatsu | .................... 358/1.9 |
| 2012/0086977 | A1* | 4/2012 | Hotta | ................. H04N 1/32325 |
| | | | | 358/1.15 |
| 2015/0222787 | A1* | 8/2015 | Sakiyama | .............. H04N 1/393 |
| | | | | 358/3.28 |

FOREIGN PATENT DOCUMENTS

| JP | 2008167314 A | * | 7/2008 |
| JP | 2009-278361 A | | 11/2009 |
| JP | 2017136709 A | * | 8/2017 |

OTHER PUBLICATIONS

GS1 2D Barcode Verification Process Implementation Guideline, Release 1.3.21, Ratified, Jul. 2015 (Year: 2015).*
Partial European search report from the European Patent Office dated Jul. 15, 2020 with respect to the corresponding EP Application No. 20170684.3.

* cited by examiner

*Primary Examiner* — Barbara D Reinier
(74) *Attorney, Agent, or Firm* — Stein IP, LLC

(57) ABSTRACT

A controller of an image processing apparatus performs one or both of an enlargement process and a conversion process when a coded image in which information is coded is included in the image data. The enlargement process is a process of pasting an enlarged coded image instead of the coded image on the image data. The conversion process is a process of pasting decoded information instead of the coded image.

2 Claims, 7 Drawing Sheets

IMAGE PROCESSING APPARATUS THAT PROCESSES IMAGE DATA INCLUDING CODED IMAGE

INCORPORATION BY REFERENCE

This application is based upon and claims the benefit of priority from the corresponding Japanese Patent Application No. 2019-085158 filed Apr. 26, 2019, the entire contents of which are hereby incorporated by reference.

BACKGROUND

The present disclosure relates to an image processing apparatus that processes image data for executing a job.

There is a case where information is embedded (included) in image data. As an example, a watermark image may be embedded in image data. As another example, a bar code may be included in image data. There is known an example of a technique for embedding information as follows.

Specifically, there is known an image forming apparatus, which generates a woven pattern image constituted of a foreground part formed as a large dot pattern and a background part formed as a small dot pattern, including additional information coded and added to the large dot pattern of the foreground part, reads a plurality of test pattern images printed using large dot patterns, decodes and recognizes the additional information of each test pattern, calculates a recognition rate thereof and an average density of the test pattern, determines a large dot pattern that has a recognition rate and an average density within predetermined ranges and is used for a test pattern close to a predetermined reference value, as a large dot pattern for record, reads a plurality of test pattern images printed using small dot patterns, calculates an average density of each test pattern, determines a small dot pattern that has an average density within a predetermined range and is used for a test pattern close to the average density of the large dot pattern for record, as a small dot pattern for record, uses a large dot pattern for record in which a predetermined additional information is coded, for forming an image of the foreground part, uses the determined small dot pattern for record for forming an image of the background part, so as to generate the woven pattern image, and superimpose the woven pattern image on an image to be printed. It is aimed to achieve both a woven pattern effect and a high recognition rate of coded information.

There is a case where an image in which information is coded (coded image) is included in image data. As the coded image, there is a bar code or a QR code. The coded image (printed matter) is read using a scanner or a camera. For instance, a user takes a picture of the coded image using a camera of a smartphone. When the obtained coded image is correctly analyzed, the information included in the coded image is provided to the user.

When the coded image is small or when the print resolution is not sufficient, the coded image may be hard to read (the response may be slow). In this case, it takes much time and effort to decode the coded image. Further, without a device for reading the coded image, the coded image cannot be decoded, and hence the information included in the coded image cannot be provided. There is a problem that requires means for appropriately providing information included in a coded image in accordance with a situation.

The known technique described above is a technique for adjusting a dot pattern of a woven pattern image. The known technique described above cannot solve the problem described above.

SUMMARY

An image processing apparatus according to the present disclosure includes at least one of an image reader and a communication circuit, and a controller. The image reader and the communication circuit obtain image data to be used for printing. When a coded image in which information is coded is included in the image data, the controller performs one or both of an enlargement process and a conversion process. The enlargement process is a process of pasting an enlarged coded image instead of the coded image on the image data, the enlarged coded image being obtained by enlarging the coded image. The conversion process is a process of pasting decoded information instead of the coded image, the decoded information being obtained by decoding the coded image.

A method of controlling an image processing apparatus according to the present disclosure includes obtaining image data to be used for printing, performing one or both of an enlargement process and a conversion process when a coded image in which information is coded is included in the image data, performing a process of pasting an enlarged coded image instead of the coded image on the image data as the enlargement process, the enlarged coded image being obtained by enlarging the coded image, and performing a process of pasting decoded information instead of the coded image as the conversion process, the decoded information being obtained by decoding the coded image.

Further features and advantages of the present disclosure will become more apparent from the description of the embodiment given below.

DETAILED DESCRIPTION

The present disclosure enables to process image data including a coded image so that information included in the coded image can be easily provided. With reference to FIGS. 1 to 11, the present disclosure is described below. In the following description, a multifunction peripheral 100 is exemplified and described as the image processing apparatus. The image processing apparatus is not limited to the multifunction peripheral 100. The image processing apparatus may be other types of image forming apparatus such as a printer. Note that elements such as structures and layouts described in this embodiment do not limit the scope of the disclosure and are merely examples for description.

(Multifunction Peripheral 100)

Figure 1:
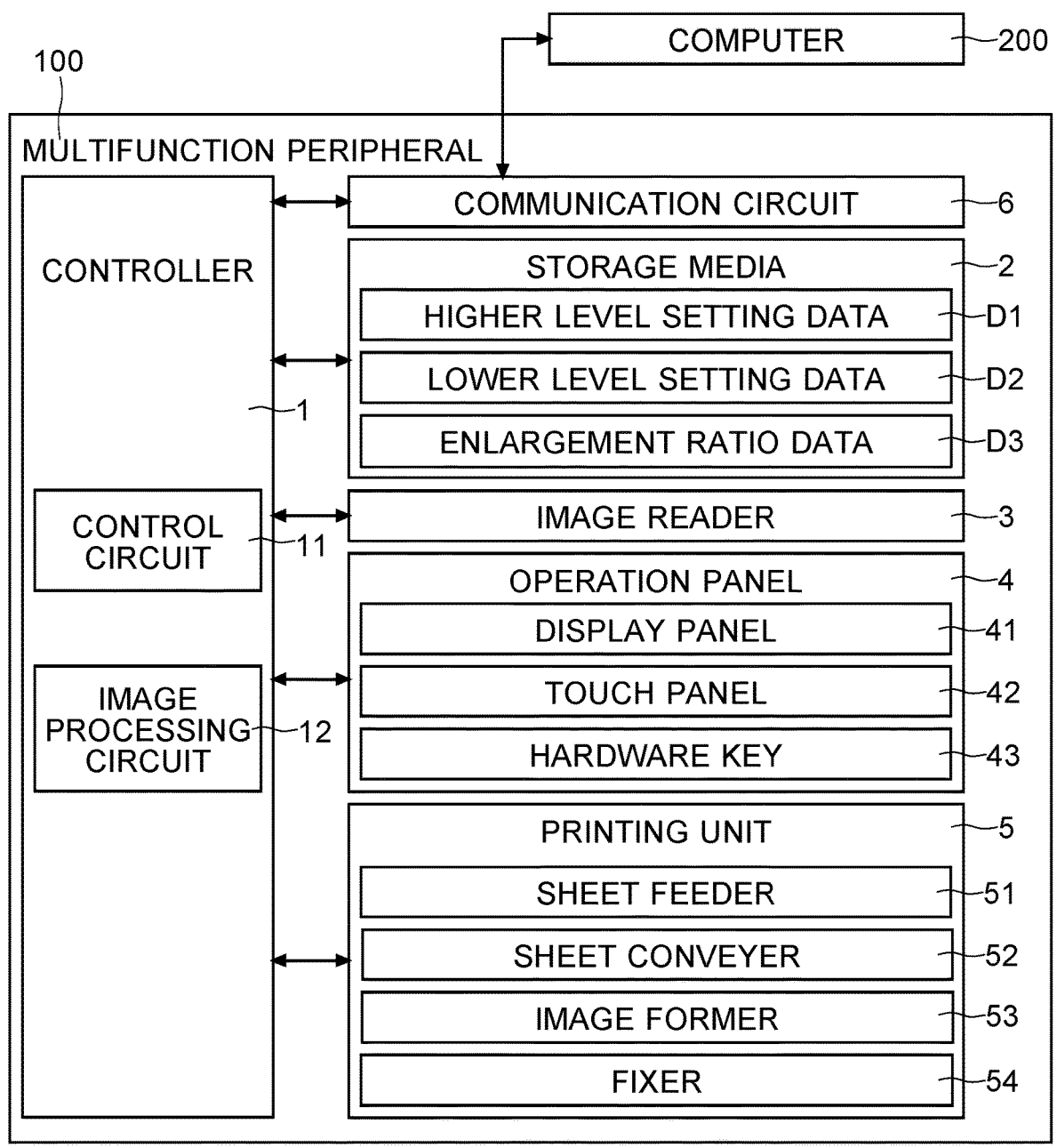
FIG. 1 is a diagram illustrating one example of a multifunction peripheral according to an embodiment.

With reference to FIG. 1, one example of the multifunction peripheral 100 according to the embodiment is described. The multifunction peripheral 100 includes a controller 1, storage media 2, an image reader 3, an operation panel 4, a printing unit 5, and a communication circuit 6.

The controller 1 controls operation of the multifunction peripheral 100. The controller 1 includes a control circuit 11, and an image processing circuit 12. The control circuit 11 is a CPU, for example. The image processing circuit 12 is an integrated circuit for image processing (e.g. an ASIC). The control circuit 11 controls individual units (the image reader 3, the operation panel 4, the printing unit 5, and the communication circuit 6) on the basis of a program and data stored in the storage media 2. The image processing circuit 12 performs various image processing.

The multifunction peripheral 100 includes a ROM, a storage device, and a RAM as the storage media 2. The ROM is a flash ROM, for example. The storage device is a large capacity of nonvolatile storage device such as an HDD or an SSD. The storage media 2 stores various data, and a control program. For instance, the storage media 2 stores control data, setting data, and image data.

The image reader 3 includes a document table (contact glass) for placing a document. When reading a document, the controller 1 controls the image reader 3 to read the document placed on the document table. In order to read a document, the image reader 3 includes a light source (lamp), a lens, and an image sensor (line sensor). Further, on the basis of reading by the image sensor, the image reader 3 generates image data. It is possible to obtain image data of the document using the image reader 3. The image reader 3 functions as an obtaining unit for obtaining image data.

The operation panel 4 includes a display panel 41, a touch panel 42, and a hardware key 43. The display panel 41 displays screens and images. The controller 1 (control circuit 11) controls display on the display panel 41. The controller 1 controls the display panel 41 to display an operation image that is used for job setting. The operation image includes buttons, keys, and tabs, for example. The touch panel 42 receives a user's operation. The touch panel 42 is disposed on a top surface of the display panel 41. The touch panel 42 recognizes a touch position. On the basis of an output of the touch panel 42, the controller 1 recognizes an operated operation image. On the basis of the operated operation image, the controller 1 recognizes a content of the user's operation. The hardware key 43 also receives a user's operation. For instance, the operation panel 4 receives print resolution setting in a printing job.

The multifunction peripheral 100 includes the printing unit 5. The printing unit 5 includes a sheet feeder 51, a sheet conveyer 52, an image former 53, and a fixer 54. The sheet feeder 51 includes a sheet cassette for storing paper sheets, and a sheet feed roller for sending out the paper sheet, for example. When performing printing, the controller 1 controls the sheet feeder 51 to feed a paper sheet. The sheet conveyer 52 includes a motor, and a conveying roller pair, for example. The controller 1 controls the sheet conveyer 52 to convey the paper sheet sent out from the sheet feeder 51. The image former 53 includes a photosensitive drum, a charging device, an exposing device, a developing device, and a transfer roller, for example. The controller 1 allows the photosensitive drum to be charged and exposed on the basis of image data. Further, the controller 1 allows an electrostatic latent image on the photosensitive drum to be developed with toner. Further, the controller 1 allows the toner image to be transferred onto the paper sheet. The fixer 54 includes a heater and a fixing roller, for example. The controller 1 controls the fixer 54 to heat and press the paper sheet with the transferred toner image. The controller 1 controls the fixer 54 to fix the toner image.

The controller 1 includes the communication circuit 6. For instance, the communication circuit 6 includes a communication control circuit, and a communication memory. The communication memory stores communication software. The communication circuit 6 (communication control circuit) can communicate with a computer 200 via a network. The computer 200 is a PC or a server, for example.

(Printing Job)

Figure 2:
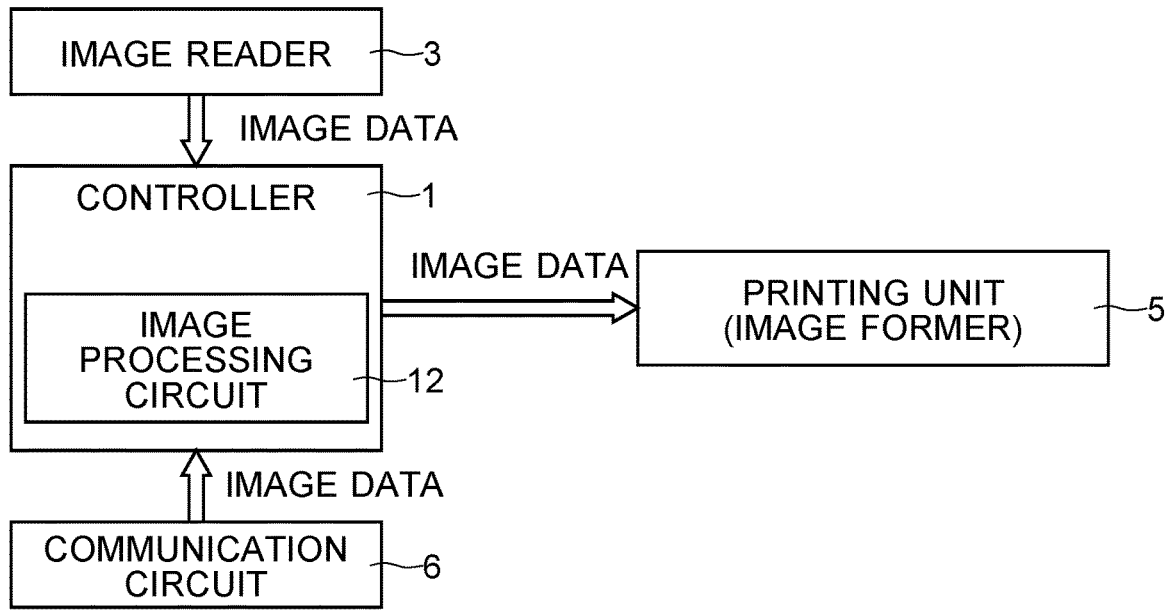
FIG. 2 is a diagram illustrating one example of a flow of a printing job in the multifunction peripheral according to the embodiment.

Next, with reference to FIG. 2, one example of the printing job in the multifunction peripheral 100 according to the embodiment is described. The multifunction peripheral 100 includes an obtaining unit for obtaining image data to be used for the printing job. The multifunction peripheral 100 includes at least one of the image reader 3 and the communication circuit 6 as the obtaining unit. In the following description, there is described an example in which the multifunction peripheral 100 includes both the image reader 3 and the communication circuit 6 as the obtaining unit.

The image reader 3 reads a set document so as to obtain image data. The printing job based on the image data read by the image reader 3 is a copy job.

Further, the communication circuit 6 obtains print data sent from the computer 200. For instance, the print data is data described in a page description language or image data to be used for printing. The printing job based on the print data is a printer job (job which use the multifunction peripheral 100 as a printer).

The multifunction peripheral 100 can perform the copy job or the printer job as the printing job. When executing the printing job, the controller 1 (the image processing circuit 12) performs image processing (process) of the obtained image data. The controller 1 generates image data for job execution on the basis of image data after the image processing. On the basis of the generated image data for job execution, the controller 1 controls the printing unit 5 to perform printing.

(Authentication of Printing Person)

Figure 3:
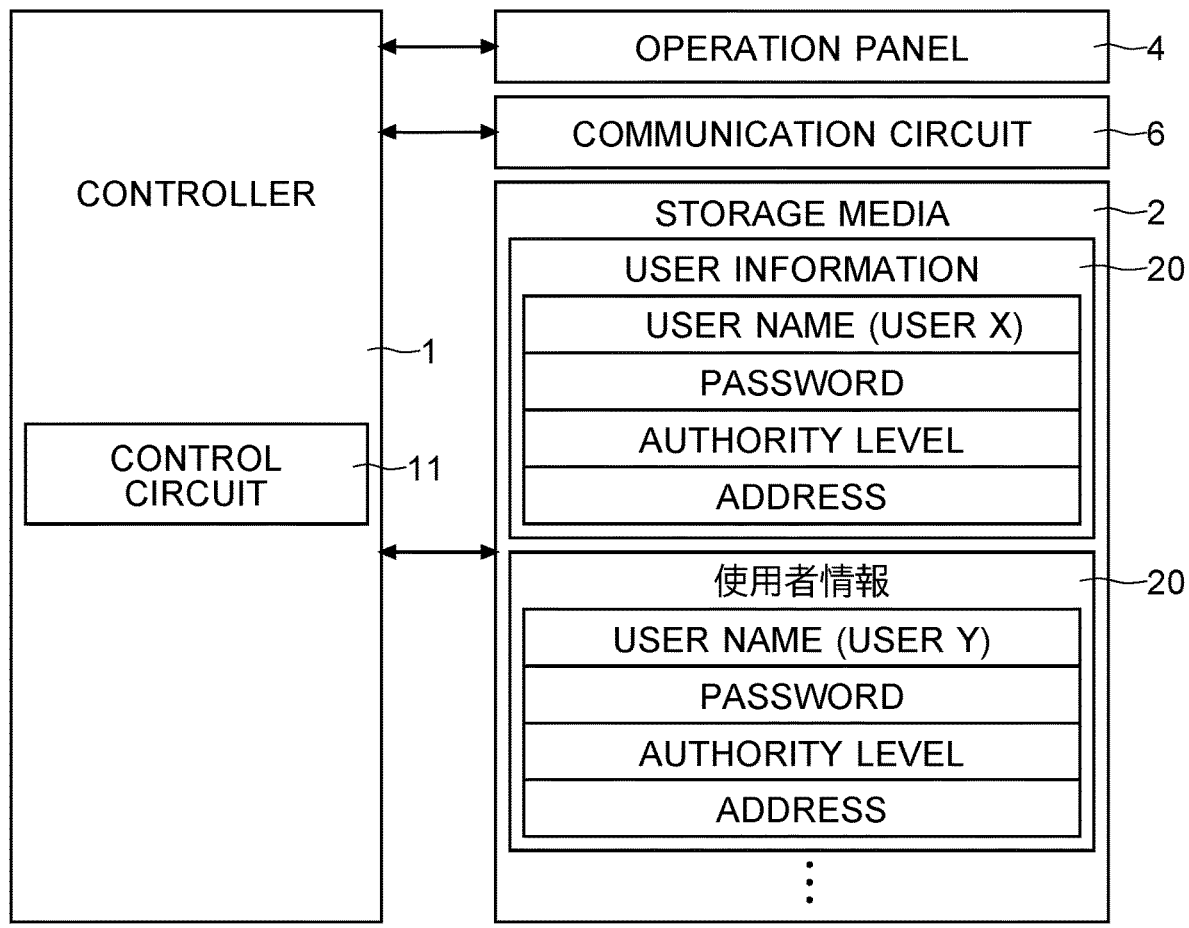
FIG. 3 is a diagram illustrating one example of the multifunction peripheral according to the embodiment.

Next, with reference to FIG. 3, there is described one example of authentication of a printing person (user) in the multifunction peripheral 100 according to the embodiment. The storage media 2 (storage device) stores user information 20 in a nonvolatile manner. The user information 20 is information of a person who can use the multifunction peripheral 100. When there are a plurality of persons who can use, the user information 20 of each user is registered in the storage media 2 in advance. Items of the user information 20 are determined in advance. For instance, the items include a user name, a password, an authority level (access level), and an address. The address is an address of the computer 200 that is used by (assigned to) the user. Using the operation panel 4, the user name, the password, and the authority level of each user, and the address can be set. The controller 1 (control circuit 11) controls the storage media 2 to store the set user name, password, authority level, and address as the user information 20 in a nonvolatile manner.

Types of the authority levels are determined in advance. The operation panel 4 receives a selection of a level for the user from a plurality of levels (a plurality of types). For instance, the selection is made from an administrator and an ordinary user. The administrator is a higher level, and the ordinary user is a lower level. Note that there may be three or more types of the authority levels. When there are three or more types, the levels are classified into the higher level and the lower level.

When performing the printing job by operating the operation panel 4 as in the copy job, the user inputs, on the operation panel 4, information (input data for decision) for receiving decision (authentication). For instance, the controller 1 (control circuit 11) controls the display panel 41 to display a log-in screen. The log-in screen is a screen for entering the input data for decision. In a state where the user is not decided (in a log-out state), the controller 1 controls the display panel 41 to display the log-in screen.

For instance, the log-in screen includes a user name input box and a password input box. When the user name input box is touched, or when the password input box is touched, the controller 1 (control circuit 11) controls the display panel 41 to display a software keyboard screen. The touch panel 42 receives the input data for decision (a user name and a password) using the software keyboard.

The controller 1 compares the input data for decision entered on the operation panel 4 with the user information 20. When there is the user information 20 matching the input data for decision, the controller 1 decides that the printing person (the operator of the operation panel 4 or the person executing the copy job) is the user corresponding to the matched user information 20. Further, on the basis of the user information 20, the controller 1 recognizes an authority level of the printing person executing the printing job using the image data. In other words, the user is authenticated. In this way, the controller 1 sets the operation panel 4 in a logged-in state. In the logged-in state, the user can make settings for a job. When there is no user information 20 matching the input data for decision, the controller 1 determines that authentication is failed. In this case, the controller 1 continues to control the display panel 41 to display the log-in screen.

In the printer job, the communication circuit 6 recognizes an address of the computer 200 that has sent data to the multifunction peripheral 100. The controller 1 compares the recognized address with the user information 20. The controller 1 decides (authenticates) that the person executing the printer job (the person who has sent the print data) is the user corresponding to the user information 20 having an address matching the recognized address. Further, on the basis of the user information 20, the controller 1 recognizes an authority level of the printing person executing the printing job using the image data. When there is no user information 20 having the same address as the recognized address, the controller 1 decides that the printing person is unknown (authentication is failed). In this case, the controller 1 does not execute the printer job, for example.

(Coded Image Processing Function)

Figure 4:
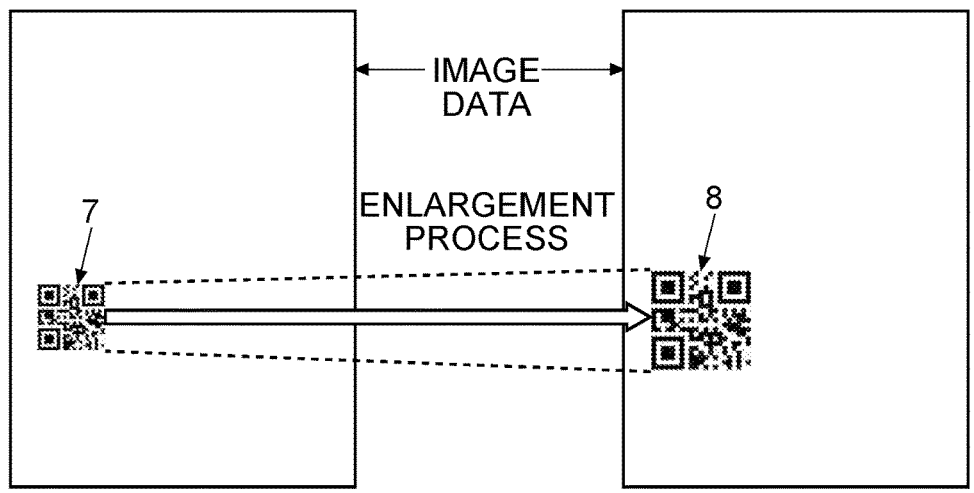
FIG. 4 is a diagram illustrating one example of an enlargement process according to the embodiment.
Figure 5:
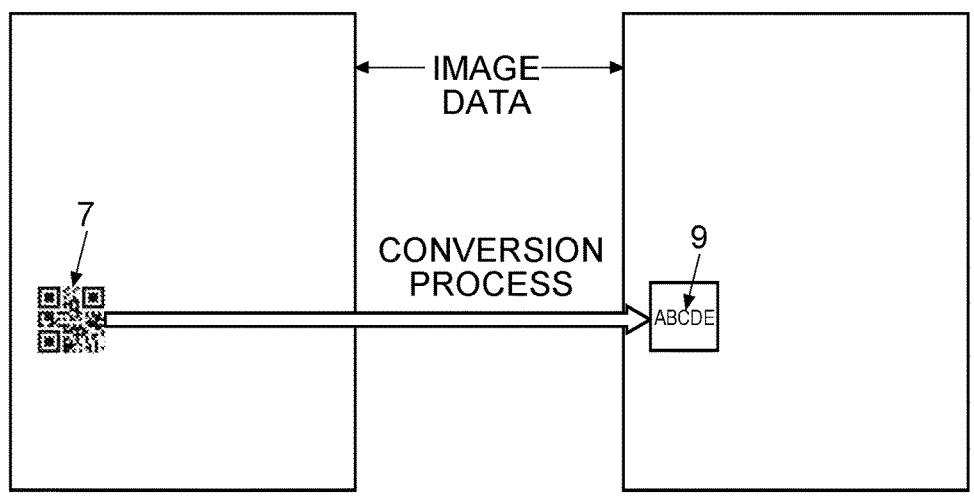
FIG. 5 is a diagram illustrating one example of a conversion process according to the embodiment.
Figure 6:
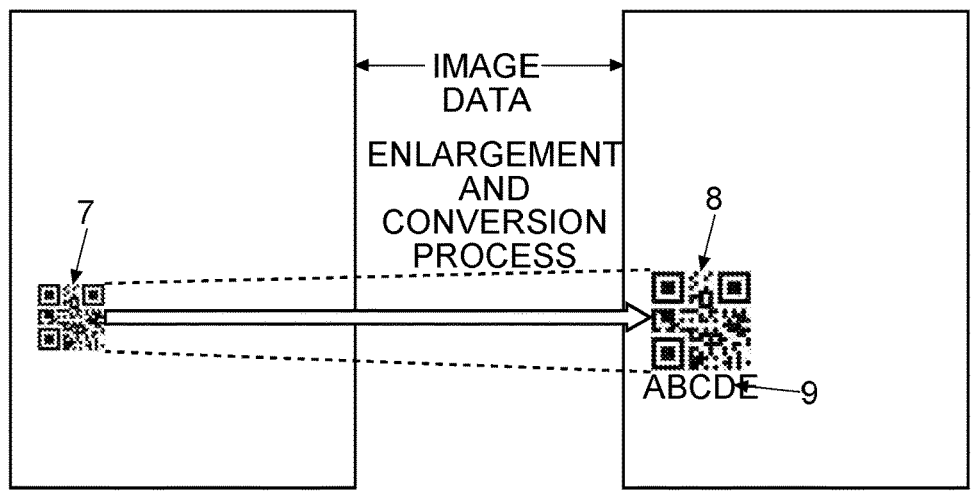
FIG. 6 is a diagram illustrating one example of an enlargement and conversion process according to the embodiment.

Next, with reference to FIGS. 4 to 6, one example of a coded image processing function of the multifunction peripheral 100 according to the embodiment is described. The multifunction peripheral 100 has the coded image processing function. The coded image processing function is a function of automatically processing a coded image 7. Here, a coded image 7 is an image in which information is coded. The coded image 7 is a two-dimensional code image, for example. For instance, it is a QR code. In the following description, a QR code is exemplified and described as the coded image 7. Note that the coded image 7 may be a two-dimensional code image other than the QR code. Further, the coded image 7 may be a one-dimensional code image (such as a bar code).

When it is set to use the coded image processing function, the controller 1 (image processing circuit 12) checks whether or not the coded image 7 is included in the image data. The controller 1 recognizes the coded image 7 on the basis of a standard to be adopted and an algorithm for detecting the coded image 7 based on the standard.

For instance, in a QR code, a finder pattern (position detection pattern) is formed at three of four corners of a square. The finder pattern is a pattern for detecting a position of the QR code. The finder pattern is a square figure in which a black square is included. The controller 1 searches the image data for the finder pattern. On the basis of a combination of the found three finder pattern squares, the controller 1 recognizes a position (location) of the QR code.

When the image data includes the coded image 7, the controller 1 (image processing circuit 12) performs an enlargement process, a conversion process, or an enlargement and conversion process. The enlargement process is a process of converting the coded image 7 into an enlarged coded image 8. FIG. 4 illustrates one example of the enlargement process. By this process, the coded image 7 is enlarged. When printing on the basis of the image data, a printed matter is obtained in which the coded image 7 is enlarged. Since the coded image 7 is enlarged, the coded image 7 can be easily read. The enlarged coded image 8 is an image obtained by enlarging the coded image 7. For instance, the controller 1 copies the coded image 7 part. Then, the controller 1 enlarges the copied coded image 7. The controller 1 pastes the enlarged coded image 8 on the image data so that the enlarged coded image 8 overlaps the original coded image 7. For instance, the controller 1 (image processing circuit 12) pastes the enlarged coded image 8 so that the center of the coded image 7 before the enlargement and the center of the enlarged coded image 8 are identical to each other. Alternatively, the controller 1 (image processing circuit 12) pastes the enlarged coded image 8 so that any one of sides of the coded image 7 before the enlargement and the corresponding side of the enlarged coded image 8 are overlapped with each other.

The conversion process is a process of converting the coded image 7 into decoded information 9. The decoded information 9 is information obtained by decoding the information included in the coded image 7. The controller 1 (image processing circuit 12) can decode the QR code. In other words, the controller 1 can reconstruct the information embedded in the QR code. When printing on the basis of the image data after the conversion process, the information included in the coded image 7 is printed. Without reading the printed matter, information included in the coded image 7 can be known.

FIG. 5 illustrates one example of the conversion process. For instance, in the conversion process, the controller 1 copies the coded image 7 part. The controller 1 analyzes the copied coded image 7. Further, the controller 1 decodes the coded image 7 (QR code). When performing only the conversion process, the controller 1 pastes the information obtained by decoding (decoded information 9) at the position where the coded image 7 was located. For instance, the controller 1 replaces the coded image 7 by a blank square and pastes the decoded information 9 on the blank.

The enlargement and conversion process is a process of performing both the enlargement process and the conversion process. In this case, the controller 1 (image processing circuit 12) performs both enlargement of the coded image 7 and reconstruction of the embedded information. FIG. 6 illustrates one example of the enlargement and conversion process. For instance, the controller 1 copies the coded image 7 and generates the enlarged coded image 8. Further, the controller 1 pastes the enlarged coded image 8 so that the center of the coded image 7 before the enlargement and the center of the enlarged coded image 8 are identical to each other. Alternatively, the controller 1 (image processing circuit 12) pastes the enlarged coded image 8 so that any one of sides of the coded image 7 before the enlargement and the corresponding side of the enlarged coded image 8 are overlapped with each other. Further, the controller 1 pastes the decoded information 9 below the enlarged coded image 8 so as to attach the same to the enlarged coded image 8. Note that the position of pasting the decoded information 9 is not limited to the position below the enlarged coded image 8.

(Setting of Coded Image Processing Function)

Figure 7:
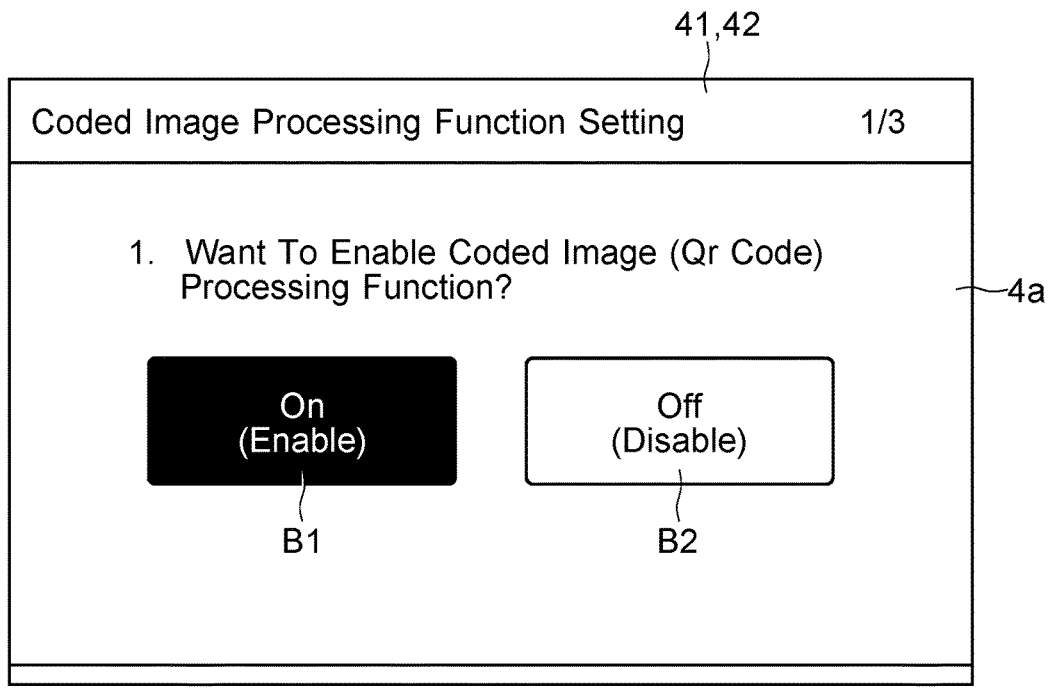
FIG. 7 is a diagram illustrating one example of a first setting screen according to the embodiment.
Figure 8:
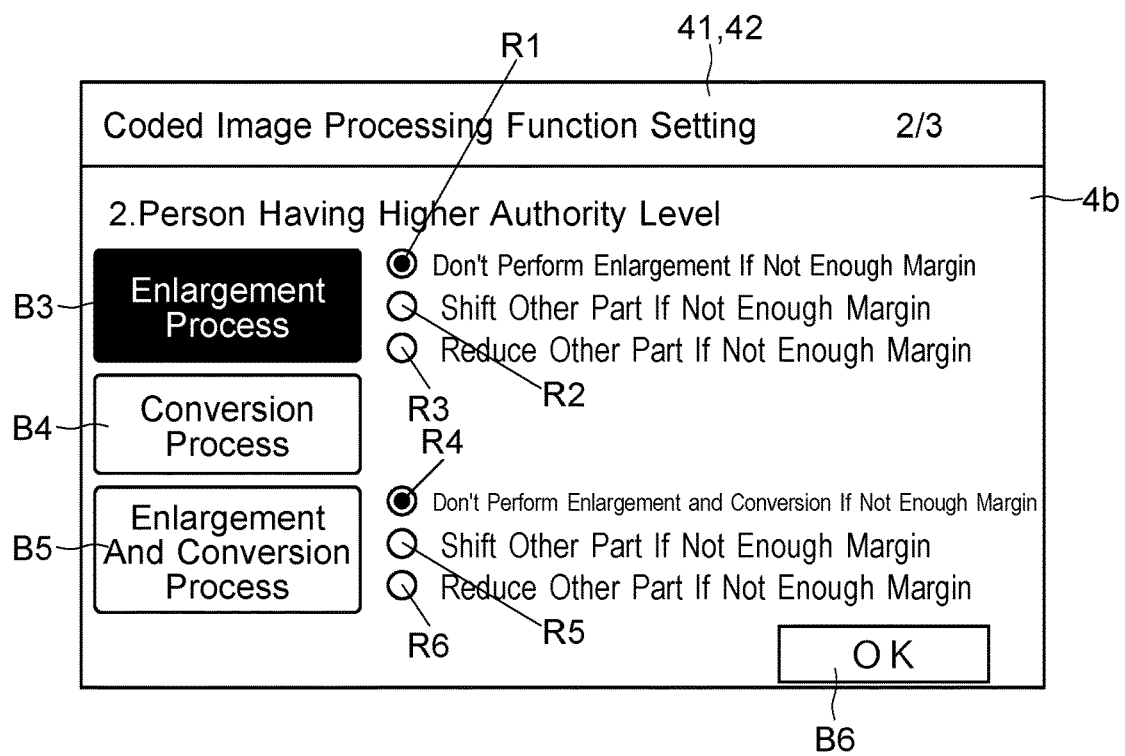
FIG. 8 is a diagram illustrating one example of a second setting screen according to the embodiment.
Figure 9:
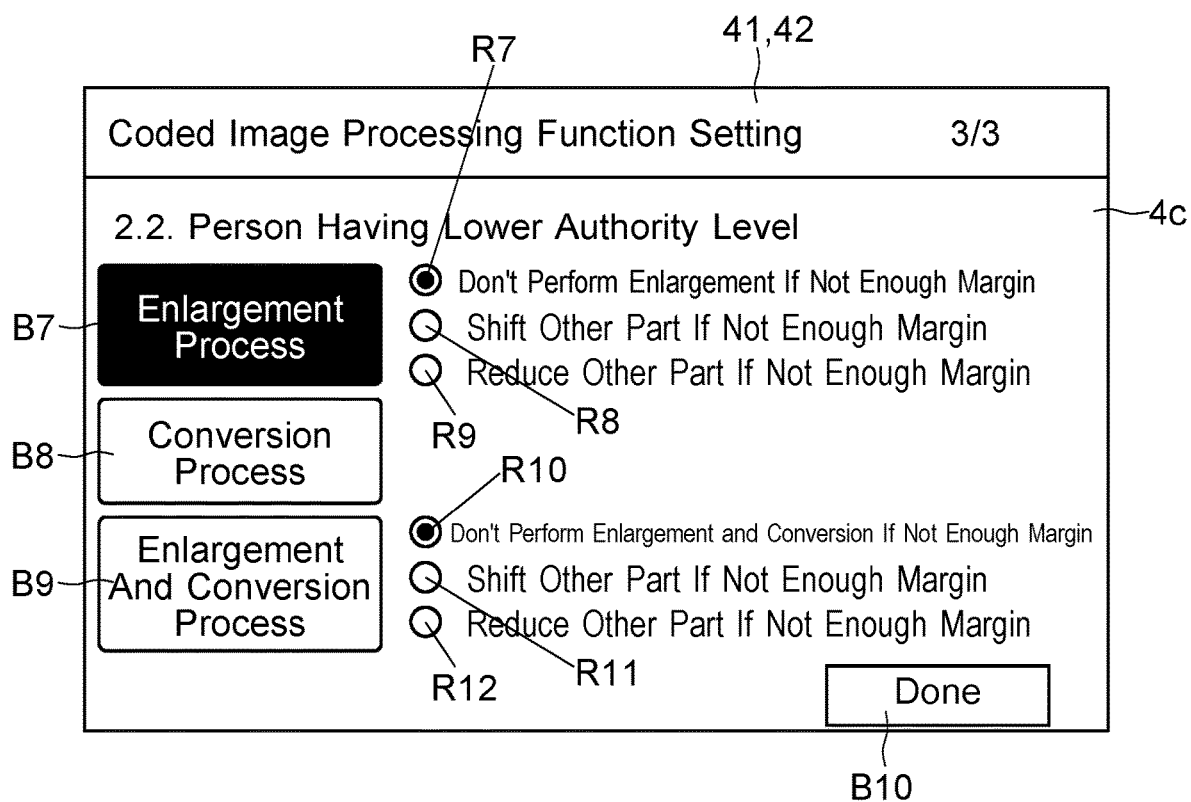
FIG. 9 is a diagram illustrating one example of a third setting screen according to the embodiment.

Next, with reference to FIGS. 7 to 9, one example of the coded image processing function according to the embodiment is described. Next, setting of the coded image processing function is described. The user opens a setting screen of the coded image processing function. The operation panel 4 receives an operation for displaying the setting screen of the coded image processing function. When this operation is made, the controller 1 (control circuit 11) controls the display panel 41 to display a first setting screen 4a.

FIG. 7 illustrates one example of the first setting screen 4a. The first setting screen 4a includes an enable button B1 and a disable button B2. The enable button B1 is a button for enabling (using) the coded image processing function. The disable button B2 is a button for disabling (inhibiting use of) the coded image processing function. In this way, the operation panel 4 receives setting whether or not to use the enlargement process, the conversion process, or the enlargement and conversion process.

When the disable button B2 is operated, the controller 1 (control circuit 11) closes the first setting screen 4a. The setting of the coded image processing function is finished. In this case, even when the image data is obtained, the controller 1 inhibits the image processing circuit 12 from finding and processing the coded image 7.

When the enable button B1 is operated, the controller 1 (control circuit 11) recognizes that the coded image processing function is enabled. Further, the controller 1 (control circuit 11) controls the display panel 41 to newly display a second setting screen 4b. The setting of the coded image processing function is continued.

FIG. 8 illustrates one example of the second setting screen 4b. The second setting screen 4b is a screen for setting an operation when the printing person (the person executing the printing job) is the higher level. A person having the higher authority level has many opportunities to handle confidential documents. In order to prevent information leakage, it is possible to make setting in accordance with the authority level.

The second setting screen 4b includes a first enlargement process button B3, a first conversion process button B4, and a first enlargement and conversion process button B5. The first enlargement process button B3 is a button for setting to perform only the enlargement process when the printing person is the higher level (administrator). The first conversion process button B4 is a button for setting to perform only the conversion process when the printing person is the higher level. The first enlargement and conversion process button B5 is a button for setting to perform the enlargement and conversion process when the printing person (the person executing the printing job) is the higher level. Only one of the first enlargement process button B3, the first conversion process button B4, and the first enlargement and conversion process button B5 can be selected.

When the printing person is the higher level, if the operation panel 4 has received setting to perform only the enlargement process, the controller 1 (image processing circuit 12) performs the enlargement process but does not perform the conversion process. If the operation panel 4 has received setting to perform only the conversion process, the controller 1 performs the conversion process but does not perform the enlargement process. If the operation panel 4 has received setting to perform both the enlargement process and the conversion process, the controller 1 performs both the enlargement process and the conversion process.

Further, the second setting screen 4b includes a first radio button R1, a second radio button R2, and a third radio button R3. The first radio button R1, the second radio button R2, and the third radio button R3 are radio buttons related to the enlargement process when the printing person is the higher level. Only one of the first radio button R1, the second radio button R2, and the third radio button R3 can be selected.

The first radio button R1 is a button for setting not to perform the enlargement process when there is not enough margin around the coded image 7, when the printing person is the higher level. When the first radio button R1 is selected, information (such as a character, a symbol, and a figure) in the image data is not lost due to pasting (overwriting) of the enlarged coded image 8. Further, a status of a part other than the coded image 7 is not changed. In other words, the operation panel 4 receives setting not to perform the enlargement process when there is not enough margin area around the coded image 7 to paste the enlarged coded image 8.

The second radio button R2 is a button for setting to shift a position of a part other than the coded image 7 when there is not enough margin around the coded image 7, when the printing person is the higher level. When a position of a part other than the coded image 7 can be shifted, the second radio button R2 is checked. It is possible to generate a space for pasting the enlarged coded image 8. It is possible to avoid missing of information (such as a character, a symbol, and a figure) in the image data due to pasting (overwriting) of the enlarged coded image 8. Further, a form of the document is not largely changed. In other words, the operation panel 4 receives setting to shift a part other than the coded image 7 when there is not enough margin area around the coded image 7 to paste the enlarged coded image 8.

The third radio button R3 is a button for setting to reduce a part other than the coded image 7 when there is not enough margin around the coded image 7, when the printing person is the higher level. When a part other than the coded image 7 can be reduced, the third radio button R3 is checked. It is possible to generate a space for pasting the enlarged coded image 8. It is possible to avoid missing of information (such as a character, a symbol, and a figure) in the image data due to pasting (overwriting) of the enlarged coded image 8. Further, a form of the document is not largely changed. In other words, the operation panel 4 receives setting to reduce a part other than the coded image 7 when there is not enough margin area around the coded image 7 to paste the enlarged coded image 8.

Furthermore, the second setting screen 4b includes a fourth radio button R4, a fifth radio button R5, and a sixth radio button R6. The fourth radio button R4, the fifth radio button R5, and the sixth radio button R6 are radio buttons related to the enlargement and conversion process when the printing person is the higher level. Only one of the fourth radio button R4, the fifth radio button R5, and the sixth radio button R6 can be selected.

The fourth radio button R4 is a button for setting not to perform the enlargement and conversion process when there is not enough margin around the coded image 7 to paste the enlarged coded image 8 and the decoded information 9. When the fourth radio button R4 is selected, information (such as a character, a symbol, and a figure) in the image data is not lost due to pasting (overwriting) of the enlarged coded image 8 and the decoded information 9. Further, a status of a part other than the coded image 7 is not changed. In other words, the operation panel 4 receives setting not to perform the enlargement and conversion process when there is not enough margin area around the coded image 7 to paste the enlarged coded image 8 and the decoded information 9.

The fifth radio button R5 is a button for setting to shift a position of a part other than the coded image 7 when there is not enough margin around the coded image 7 to paste the enlarged coded image 8 and the decoded information 9. When a position of a part other than the coded image 7 can be shifted, the fifth radio button R5 is checked. It is possible to generate a space for pasting the enlarged coded image 8 and the decoded information 9. It is possible to avoid missing of information (such as a character, a symbol, and a figure) in the image data due to pasting (overwriting) of the enlarged coded image 8 and the decoded information 9. Further, a form of the document is not largely changed. In other words, the operation panel 4 receives setting to shift a part other than the coded image 7 when there is not enough margin area around the coded image 7 to paste the enlarged coded image 8 and the decoded information 9.

The sixth radio button R6 is a button for setting to reduce a part other than the coded image 7 when there is not enough margin around the coded image 7 to paste the enlarged coded image 8 and the decoded information 9. When a part other than the coded image 7 can be reduced, the sixth radio button R6 is checked. It is possible to generate a space for pasting the enlarged coded image 8 and the decoded information 9. It is possible to avoid missing of information (such as a character, a symbol, and a figure) in the image data due to pasting (overwriting) of the enlarged coded image 8 and the decoded information 9. Further, a form of the document is not largely changed. In other words, the operation panel 4 receives setting to reduce a part other than the coded image 7 when there is not enough margin area around the coded image 7 to paste the enlarged coded image 8 and the decoded information 9.

The second setting screen 4b includes an OK button B6. When the OK button B6 is operated, the setting related to the person whose authority level is the higher level is finished. In this case, the controller 1 (control circuit 11) controls the storage media 2 to store higher level setting data D1 in a nonvolatile manner (see FIG. 1). The higher level setting data D1 is data indicating a content set (selected) on the second setting screen 4b.

When the operation panel 4 receives an operation of the OK button B6, the controller 1 (control circuit 11) controls the display panel 41 to newly display a third setting screen 4c. The setting of the coded image processing function is continued. FIG. 9 illustrates one example of the third setting screen 4c. The third setting screen 4c is a screen for setting an operation when the printing person is the lower level. It is possible to make setting of the coded image processing function in accordance with the authority level.

The third setting screen 4c includes a second enlargement process button B7, a second conversion process button B8, and a second enlargement and conversion process button B9. The second enlargement process button B7 is a button for setting to perform only the enlargement process, when the printing person (the person executing the printing job) is the lower level (ordinary user). The second conversion process button B8 is a button for setting to perform only the conversion process when the printing person (the person executing the printing job) is the lower level. The second enlargement and conversion process button B9 is a button for setting to perform the enlargement and conversion process when the printing person (the person executing the printing job) is the lower level. Only one of the second enlargement process button B7, the second conversion process button B8, and the second enlargement and conversion process button B9 can be selected.

When the printing person is the lower level, if the operation panel 4 has received setting to perform only the enlargement process, the controller 1 (image processing circuit 12) performs the enlargement process but does not perform the conversion process. If the operation panel 4 has received setting to perform only the conversion process, the controller 1 performs the conversion process but does not perform the enlargement process. If the operation panel 4 has received setting to perform both the enlargement process and the conversion process, the controller 1 performs the enlargement and conversion process (both the enlargement process and the conversion process).

Further, the third setting screen 4c includes a seventh radio button R7, an eighth radio button R8, and a ninth radio button R9. The seventh radio button R7, the eighth radio button R8, and the ninth radio button R9 are radio buttons related to the enlargement process when the printing person is the lower level. Only one of the seventh radio button R7, the eighth radio button R8, and the ninth radio button R9 can be selected.

The seventh radio button R7 is a button for setting not to perform the enlargement process when there is not enough margin around the coded image 7, when the printing person is the lower level. The operation panel 4 receives setting not to perform the enlargement process when there is not enough margin area around the coded image 7 to paste the enlarged coded image 8.

The eighth radio button R8 is a button for setting to shift a position of a part other than the coded image 7 when there is not enough margin around the coded image 7, when the printing person is the lower level. The operation panel 4 receives setting to shift a part other than the coded image 7 when there is not enough margin area around the coded image 7 to paste the enlarged coded image 8.

The ninth radio button R9 is a button for setting to reduce a part other than the coded image 7 when there is not enough margin around the coded image 7, when the printing person is the lower level. The operation panel 4 receives setting to reduce a part other than the coded image 7 when there is not enough margin area around the coded image 7 to paste the enlarged coded image 8.

Furthermore, the third setting screen 4c includes a tenth radio button R10, an eleventh radio button R11, and a twelfth radio button R12. The tenth radio button R10, the eleventh radio button R11, and the twelfth radio button R12 are radio buttons related to the enlargement and conversion process when the printing person is the lower level. Only one of the tenth radio button R10, the eleventh radio button R11, and the twelfth radio button R12 can be selected.

The tenth radio button R10 is a button for setting not to perform the enlargement and conversion process when there is not enough margin around the coded image 7 to paste the enlarged coded image 8 and the decoded information 9, when the printing person is the lower level. The operation panel 4 receives setting not to perform the enlargement and conversion process when there is not enough margin area around the coded image 7 to paste the enlarged coded image 8 and the decoded information 9.

The eleventh radio button R11 is a button for setting to shift a position of a part other than the coded image 7 when there is not enough margin around the coded image 7 to paste the enlarged coded image 8 and the decoded information 9, when the printing person is the lower level. The operation panel 4 receives setting to shift a part other than the coded image 7 when there is not enough margin area around the coded image 7 to paste the enlarged coded image 8 and the decoded information 9.

The twelfth radio button R12 is a button for setting to reduce a part other than the coded image 7 when there is not enough margin around the coded image 7 to paste the enlarged coded image 8 and the decoded information 9, when the printing person is the lower level. The operation panel 4 receives setting to reduce a part other than the coded image 7 when there is not enough margin area around the coded image 7 to paste the enlarged coded image 8 and the decoded information 9.

The third setting screen 4c includes a Done button B10. When the Done button B10 is operated, setting related to the person whose authority level is the lower level is finished. In this case, the controller 1 (control circuit 11) controls the storage media 2 to store lower level setting data D2 in a nonvolatile manner (see FIG. 1). The lower level setting data D2 is data indicating a content set (selected) on the third setting screen 4c.

(Flow of Printing Using Coded Image Processing Function)

Figure 10:
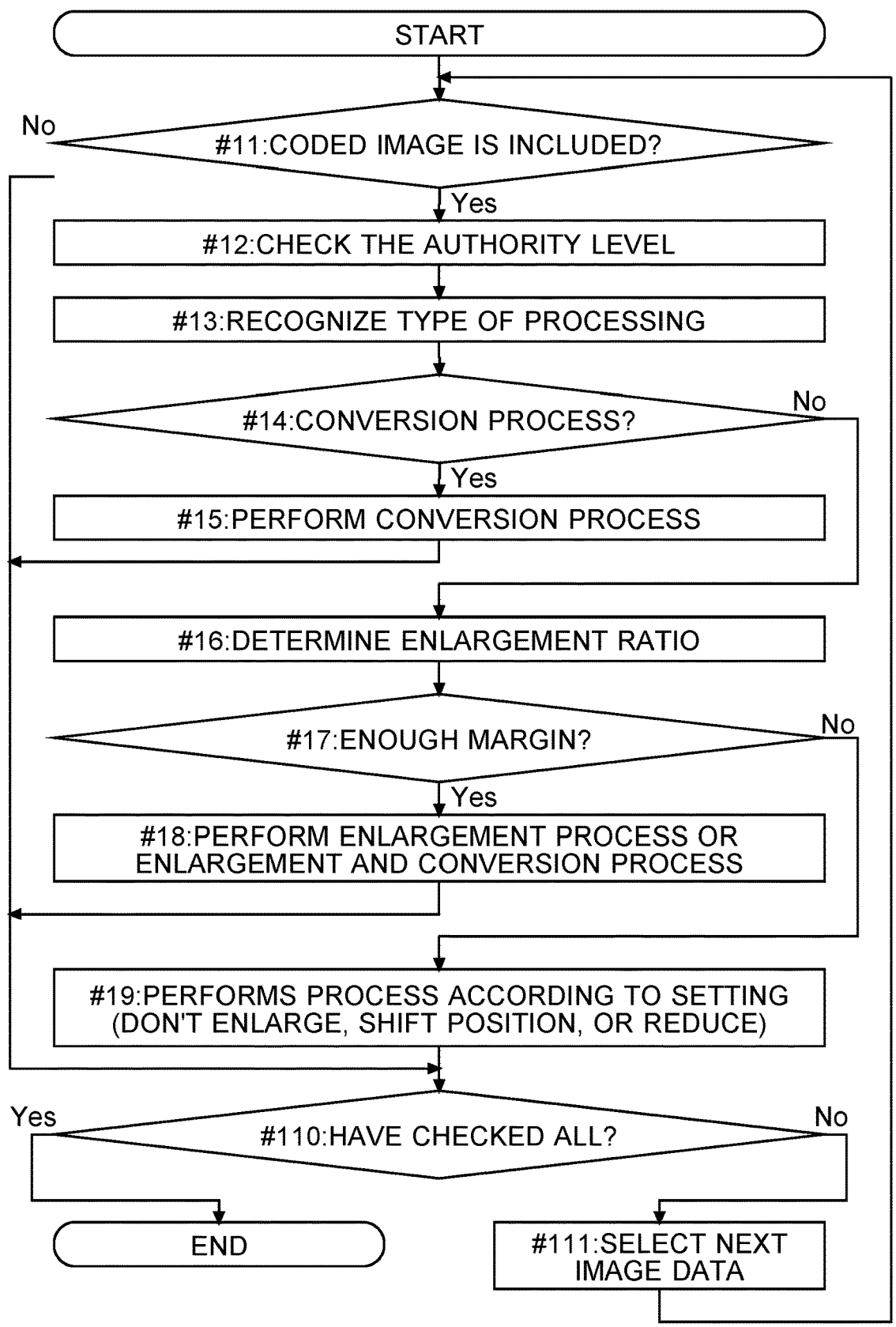
FIG. 10 is a diagram illustrating one example of printing in a coded image processing function according to the embodiment.
Figure 11:
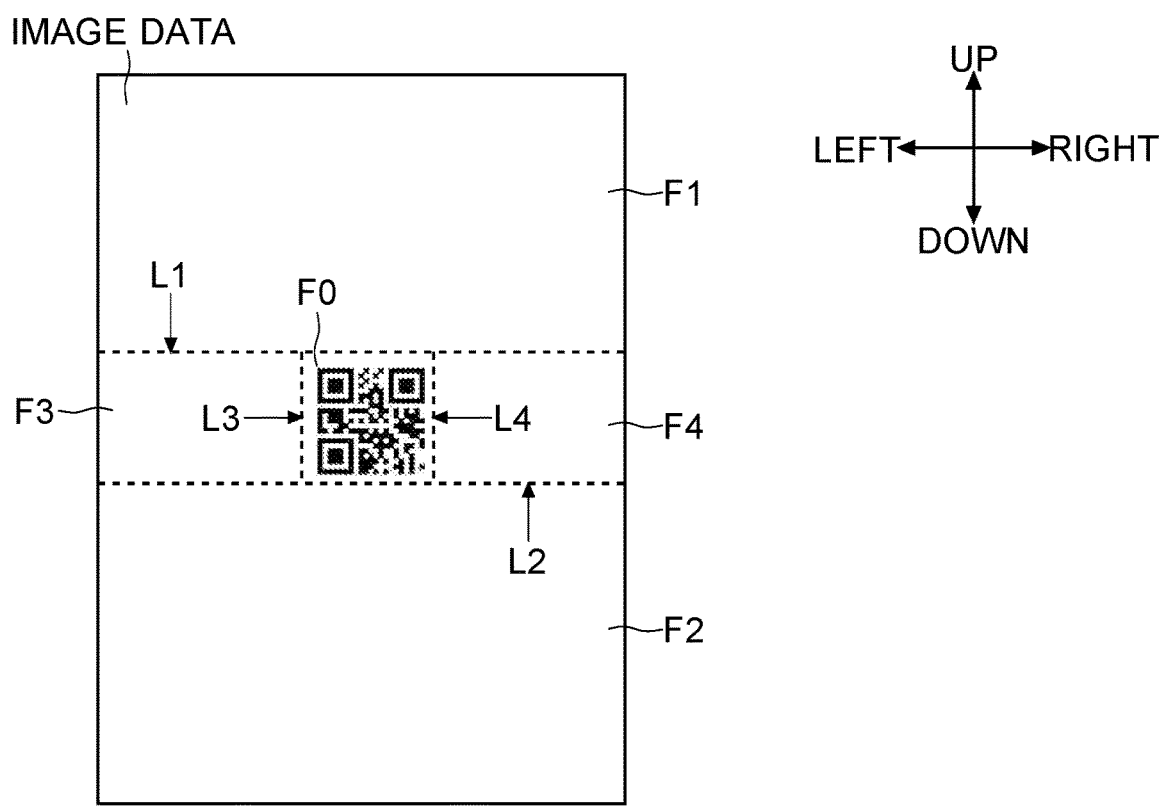
FIG. 11 is a diagram illustrating one example of processing performed in the enlargement process or the enlargement and conversion process according to the embodiment.

Next, with reference to FIGS. 10 and 11, there is described one example of a flow of printing using the coded image processing function according to the embodiment. The flow of FIG. 10 starts when the printing job is starting in a state where the coded image processing function is set to be enabled. In this case, image data of a first sheet (a first page) has been obtained.

The controller 1 (image processing circuit 12) checks whether or not the obtained image data includes the coded image 7 (Step #11). When the coded image 7 is included (Yes in Step #11), the controller 1 (control circuit 11) checks the authority level of the printing person (the person executing the printing job) (Step #12). On the basis of the decided user information 20 of the printing person, the controller 1 recognizes the authority level.

On the basis of the recognized authority level of the printing person, the controller 1 (control circuit 11) recognizes a type of processing the coded image 7 (Step #13). Specifically, the controller 1 checks which one of the enlargement process, the conversion process, and the enlargement and conversion process is to be performed. When the authority level of the printing person is the higher level, the controller 1 recognizes the type by referring to the higher level setting data D1. When the authority level of the printing person is the lower level, the controller 1 recognizes the type by referring to the lower level setting data D2.

The controller 1 (control circuit 11) checks whether or not the process to be performed is the conversion process (Step #14). When the process to be performed is the conversion process (Yes in Step #14), the controller 1 (image processing circuit 12) performs the conversion process of the coded image 7 in the image data (Step #15).

When it is not the conversion process (When it is the enlargement process or the enlargement and conversion process) (No in Step #14), the controller 1 (control circuit 11) determines an enlargement ratio of the coded image 7 (QR code) (Step #16). The controller 1 sets a smaller value to the enlargement ratio of the enlarged coded image 8 to the coded image 7, as a resolution of printing based on the image data is higher. The controller 1 sets a larger value to the enlargement ratio of the enlarged coded image 8 to the coded image 7, as a resolution of printing based on the image data is smaller. It is because when the resolution of printing is small, it may take long time until recognition (reading) of the two-dimensional code is finished.

In a case of the copy job, the operation panel 4 receives setting of a print resolution. In a case of the printer job, the print resolution can be set on the computer 200 that sends the print data. The computer 200 sends data indicating the print resolution together with the print data to the multifunction peripheral 100. The controller 1 recognizes the print resolution in the printer job on the basis of the data received by the communication circuit 6. The controller 1 controls the image former 53 to form the toner image with the recognized print resolution.

The storage media 2 stores enlargement ratio data D3 defining the enlargement ratio corresponding to the print resolution in a nonvolatile manner (see FIG. 1). The controller 1 refers to the enlargement ratio data D3. Then, the controller 1 recognizes the enlargement ratio corresponding to the print resolution in the printing job to be executed. Note that the enlargement ratio may be a fixed value regardless of the print resolution.

When performing the enlargement process or the enlargement and conversion process, the controller 1 (control circuit 11) checks whether or not there is enough margin around the coded image 7 (Step #17). With this process, it is checked whether or not there is a character, a symbol, or a figure that is overwritten by pasting the enlarged coded image 8.

When performing only the enlargement process, the controller 1 (image processing circuit 12) determines whether or not there is enough margin to paste the enlarged coded image 8. First, the image processing circuit 12 recognizes a size of the coded image 7. The image processing circuit 12 determines a size of the enlarged coded image 8 on the basis of the size of the coded image 7 and the enlargement ratio determined in Step #15.

Further, controller 1 (image processing circuit 12) extracts from the image data an area inside the enlarged coded image 8 and outside the coded image 7 when the enlarged coded image 8 is pasted on the coded image 7. The controller 1 counts the number of high density pixels (black or dark pixels) included in the extracted area. The range of pixel value regarded as high density is determined in advance. When the number of high density pixels is larger than a predetermined threshold value, the controller 1 (image processing circuit 12) determines that there is not enough margin to paste the enlarged coded image 8. When the number of high density pixels is the predetermined threshold value or smaller, the controller 1 determines there is enough margin to paste the enlarged coded image 8. The threshold value may be zero or may be a value larger than zero.

When performing the enlargement and conversion process, the controller 1 (image processing circuit 12) determines whether or not there is enough margin to paste the enlarged coded image 8 and the decoded information 9. First, the image processing circuit 12 recognizes a size of the coded image 7. The image processing circuit 12 determines a size of the enlarged coded image 8 on the basis of the size of the coded image 7 and the enlargement ratio determined in Step #15. Further, the image processing circuit 12 determines a size of the area necessary to paste the decoded information 9.

Then, the controller 1 (image processing circuit 12) extracts from the image data an area inside the area of pasting the enlarged coded image 8 and the decoded information 9 and outside the coded image 7, when the enlarged coded image 8 and the decoded information 9 are pasted. The controller 1 counts the number of high density pixels (black or dark pixels) included in the extracted area. When the number of high density pixels is larger than a predetermined threshold value, the controller 1 (image processing circuit 12) determines that there is not enough margin to paste the enlarged coded image 8 and the decoded information 9. When the number of high density pixels is the predetermined threshold value or smaller, the controller 1 (image processing circuit 12) determines that there is enough margin to paste the enlarged coded image 8 and the decoded information 9.

When it is determined that there is enough margin around the coded image 7 (Yes in Step #17), the controller 1 (image processing circuit 12) performs the enlargement process or the enlargement and conversion process of the coded image 7 (Step #18).

When it is determined that there is not enough margin around the coded image 7 (No in Step #17), the controller 1 (image processing circuit 12) performs the process in accordance with the setting (Step #19). For instance, when the setting not to perform the enlargement process has been made, the controller 1 (control circuit 11) inhibits the image processing circuit 12 from performing the enlargement process or the enlargement and conversion process. This is the case where the first radio button R1, the fourth radio button R4, the seventh radio button R7, or the tenth radio button R10 has been operated.

When the setting to shift a position of a part other than the coded image 7 has been made, the controller 1 (image processing circuit 12) performs the process of shifting the position on the image data. This is the case where the second radio button R2, the fifth radio button R5, the eighth radio button R8, or the eleventh radio button R11 has been operated.

With reference to FIG. 11, there is described one example of the process of shifting a position of a part other than the coded image 7. First, the controller 1 (image processing circuit 12) divides the image data into five areas. One of the five areas is the area including the coded image 7 (a coded image area F0). This area is not moved. The controller 1 sets the area of the coded image 7 and its surrounding part by a predetermined width as the coded image area F0.

Next, the controller 1 sets the area above the coded image area F0 as an upper area F1. Further, the controller 1 sets the area below the coded image area F0 as a lower area F2. Specifically, the controller 1 (image processing circuit 12) sets the area above a first border line L1 as the upper area F1. The first border line L1 overlaps the upper side of the coded image area F0 and extends from the left end to the right end of the image data. Further, the controller 1 sets the area below a second border line L2 as the lower area F2. The second border line L2 overlaps the lower side of the coded image area F0 and extends from the left end to the right end of the image data.

Furthermore, the controller 1 (image processing circuit 12) sets a third border line L3. The third border line L3 overlaps the left side of the coded image area F0 and connects the first border line L1 and the second border line L2. The controller 1 sets the area on the left of the third border line L3 (coded image area F0) as a left area F3. Further, the controller 1 sets a fourth border line L4. The fourth border line L4 overlaps the right side of the coded image area F0 and connects the first border line L1 and the second border line L2. The controller 1 sets the area on the right of the fourth border line L4 (coded image area F0) as a right area F4.

In an ordinary document, there are margins on the upper, lower, left, and right sides. Even when these margins are reduced a little, a form of the document is not largely changed. Hence, concerning the upper area F1, the controller 1 (image processing circuit 12) shift image data upward. Concerning the lower area F2, the controller 1 (image processing circuit 12) shift image data downward. Concerning the left area F3, the controller 1 (image processing circuit 12) shift image data leftward. Concerning the right area F4, the controller 1 (image processing circuit 12) shift image data rightward.

In case of the enlargement process, the controller 1 (image processing circuit 12) pastes the enlarged coded image 8 so that it overlaps the coded image 7. For instance, the controller 1 determines an interval (a difference) between the upper side of the coded image 7 and the upper side of the enlarged coded image 8. The controller 1 shifts the upper area F1 upward by the determined interval. Further, for example, the controller 1 determines an interval (a difference) between the lower side of the coded image 7 and the lower side of the enlarged coded image 8. The controller 1 shifts the lower area F2 downward by the determined interval. Further, for example, the controller 1 determines an interval (a difference) between the left side of the coded image 7 and the left side of the enlarged coded image 8. The controller 1 shifts the left area F3 leftward by the determined interval. Further, for example, the controller 1 determines an interval (a difference) between the right side of the coded image 7 and the right side of the enlarged coded image 8. The controller 1 shifts the right area F4 rightward by the determined interval.

In case of the enlargement and conversion process, for example, the controller 1 (image processing circuit 12) pastes the enlarged coded image 8 so that it overlaps the coded image 7, and pastes the decoded information 9 below the enlarged coded image 8. For instance, the controller 1 determines an interval (a difference) between the upper side of the coded image 7 and the upper side of the enlarged coded image 8. The controller 1 shifts upward the upper area F1 by the determined interval. Further, for example, the controller 1 determines an interval (a difference) between the lower side of the coded image 7 and the lower side of the area of pasting the decoded information 9. The controller 1 shifts downward the lower area F2 by the determined interval. Further, for example, the controller 1 determines an interval (a difference) between the left side of the coded image 7 and the left side of the enlarged coded image 8. The controller 1 shifts leftward the left area F3 by the determined interval. Further, for example, the controller 1 determines an interval (a difference) between the right side of the coded image 7 and the right side of the enlarged coded image 8. The controller 1 shifts rightward the right area F4 by the determined interval.

When the setting to reduce a part other than the coded image 7 has been made, the controller 1 (image processing circuit 12) performs the reducing process on the image data. This is the case where the third radio button R3, the sixth radio button R6, the ninth radio button R9, or the twelfth radio button R12 has been operated.

One example of the reducing process is described. Also in case of the reducing process, the controller 1 (image processing circuit 12) divides the image data into five areas. A method of dividing into the five areas may be the same as described above with reference to FIG. 11. In case of the reducing process, the controller 1 (image processing circuit 12) pastes the enlarged coded image 8 so that it overlaps the coded image 7. For instance, the controller 1 determines an interval (a difference) between the upper side of the coded image 7 and the upper side of the enlarged coded image 8. The controller 1 reduces the upper area F1 so that the width in the up and down direction is decreased by the determined interval. The controller 1 makes the upper side of the upper area F1 after reduction be identical to the upper side of the image data. Further, for example, the controller 1 determines an interval (a difference) between the lower side of the coded image 7 and the lower side of the enlarged coded image 8. The controller 1 reduces the lower area F2 so that the width in the up and down direction is decreased by the determined interval. The controller 1 makes the lower side of the lower area F2 after reduction be identical to the lower side of the image data.

Further, for example, the controller 1 determines an interval (a difference) between the left side of the coded image 7 and the left side of the enlarged coded image 8. The controller 1 reduces the left area F3 so that the width of the left area F3 in the left and right direction is decreased by the determined interval. The controller 1 makes the left side of the left area F3 after reduction be identical to the left side of the image data. Further, for example, the controller 1 determines an interval (a difference) between the right side of the coded image 7 and the right side of the enlarged coded image 8. The controller 1 reduces the right area F4 so that the width of the right area F4 in the left and right direction is decreased by the determined interval. The controller 1 makes the right side of the right area F4 after reduction be identical to the right side of the image data.

In case of the enlargement and conversion process, for example, the controller 1 (image processing circuit 12) pastes the enlarged coded image 8 so that it overlaps the coded image 7, and pastes the decoded information 9 below the enlarged coded image 8. For instance, the controller 1 determines an interval (a difference) between the upper side of the coded image 7 and the upper side of the enlarged coded image 8. The controller 1 reduces the upper area F1 so that the width in the up and down direction is decreased by the determined interval. The controller 1 makes the upper side of the upper area F1 after reduction be identical to the upper side of the image data.

Further, for example, the controller 1 determines an interval (a difference) between the lower side of the coded image 7 and the lower side of the area of pasting the decoded information 9. The controller 1 reduces the lower area F2 so that the width in the up and down direction is decreased by the determined interval. The controller 1 makes the lower side of the lower area F2 after reduction be identical to the lower side of the image data.

Further, for example, the controller 1 determines an interval (a difference) between the left side of the coded image 7 and the left side of the enlarged coded image 8. The controller 1 reduces the left area F3 so that the width of the left area F3 in the left and right direction is decreased by the determined interval. The controller 1 makes the left side of the left area F3 after reduction be identical to the left side of the image data. Further, for example, the controller 1 determines an interval (a difference) between the right side of the coded image 7 and the right side of the enlarged coded image 8. The controller 1 reduces the right area F4 so that the width of the right area F4 in the left and right direction is decreased by the determined interval. The controller 1 makes the right side of the right area F4 after reduction be identical to the right side of the image data.

In case of No in Step #11 (in case where the coded image 7 is not included), or after Step #15, Step #18, or Step #19, the controller 1 (control circuit 11) checks whether or not the checking whether or not the coded image 7 is included is finished for all image data to be used for the printing job (Step #110).

When the checking is finished for all image data (Yes in Step #110), the controller 1 (the control circuit 11 and the image processing circuit 12) finishes the process of this flowchart (END). When image data to be checked is still remained, the controller 1 (control circuit 11) selects the next image data (Step #111). Then, the controller 1 performs Step #11 (returns to Step #11).

In this way, the image processing apparatus (such as the multifunction peripheral 100) according to the embodiment includes the obtaining unit (the image reader 3, the communication circuit 6), and the controller 1 (the control circuit 11, the image processing circuit 12). The obtaining unit obtains image data to be used for printing. When the coded image 7 in which information is coded is included in the image data, the controller 1 performs one or both of the enlargement process and the conversion process. The enlargement process is a process of pasting the enlarged coded image 8 instead of the coded image 7 on the image data, the enlarged coded image 8 being obtained by enlarging the coded image 7. The conversion process is a process of pasting the decoded information 9 instead of the coded image 7, the decoded information 9 being obtained by decoding the coded image 7.

The coded image 7 can be automatically enlarged. When printing is performed on the basis of image data, the coded image 7 is enlarged and printed. The image data can be processed so that the coded image 7 can be easily read. Further, information included in the coded image 7 can be decoded. When printing is performed on the basis of image data, the decoded information 9 of the coded image 7 is printed. The image data can be processed so that the printing person can easily understand the information included in the coded image 7.

The image processing apparatus (the multifunction peripheral 100) includes the operation panel 4 for receiving setting. When the operation panel 4 has received setting to perform only the enlargement process, the controller 1 performs the enlargement process but does not perform the conversion process. When the operation panel 4 has received setting to perform only the conversion process, the controller 1 performs the conversion process but does not perform the enlargement process. When the operation panel 4 has received setting to perform the enlargement and conversion process, the controller 1 performs both the enlargement process and the conversion process. It is possible to select which process should be performed. It is possible to make setting to perform only a desired process.

The controller 1 determines whether or not there is a margin around the coded image 7. It may be possible that the controller 1 does not perform the enlargement process when it determines that there is no margin. It is possible not to perform the enlargement process when a margin around the coded image 7 is small. It is possible not to enlarge the coded image 7 when the enlarged coded image overlaps a non-margin part (such as a character part).

The image processing apparatus includes the storage media 2 that stores the user information 20 for deciding the user. The operation panel 4 receives setting whether or not to perform the conversion process when the authority level of the printing person is a predetermined higher level. The controller 1 recognizes the authority level of the printing person on the basis of the user information 20. When the authority level of the printing person is the higher level, and if the setting to perform the conversion process has been made, the controller 1 performs the conversion process. If the setting not to perform the conversion process has been made, the controller 1 does not perform the conversion process. It is possible to set whether or not to perform the conversion process in detail in accordance with the authority level of the printing person. For instance, a document to be printed by a person such as a manager having a high authority level may include confidential information. The confidential information may be a coded image. In order to prevent leakage of information, there is a case where the coded image 7 should not be converted. Further, it is possible to limit the function so that the conversion process is not performed for a person having a high authority level.

The operation panel 4 receives setting whether or not to perform the enlargement process when the authority level of the printing person is the higher level. When the authority level of the printing person is the higher level, and if the setting to perform the enlargement process has been made, the controller 1 performs the enlargement process. If the setting not to perform the enlargement process has been made, the controller 1 does not perform the enlargement process. It is possible to set whether or not to perform the enlargement process in detail in accordance with the authority level of the printing person. For instance, in a document to be printed by a person having a high authority level such as a department manager, it may be preferred that the coded image 7 cannot easily read. Further, it is possible to limit the function so that the enlargement process is not performed for a person having a high authority level.

The operation panel 4 receives setting whether or not to perform the conversion process when the authority level of the printing person is the lower level that is lower than the higher level. When the authority level of the printing person is the lower level, and if the setting to perform the conversion process has been made, the controller 1 performs the conversion process. If the setting not to perform the conversion process has been made, the controller 1 does not perform the conversion process. It is possible to set whether or not to perform the conversion process in detail for a person having a low authority level. It is possible to set allowance or inhibition of the conversion process for a person having an authority level lower than a reference level.

The operation panel 4 receives setting whether or not to perform the enlargement process when the authority level of the printing person is the lower level. When the authority level of the printing person is the lower level, and if the setting to perform the enlargement process has been made, the controller 1 performs the enlargement process. If the setting not to perform the enlargement process has been made, the controller 1 does not perform the enlargement process. It is possible to set whether or not to perform the enlargement process in detail for a person having the low authority level. It is possible to set allowance or inhibition of the enlargement process for a person having an authority level lower than a reference level.

When performing the enlargement process, the controller 1 secures an area for pasting the enlarged coded image 8 by shifting a position of a part other than the coded image 7, or by reducing a part other than the coded image 7 in the image data. By shifting a position of a part other than the coded image 7, or by changing a size of a part other than the coded image 7, a blank space to paste the enlarged coded image 8 can be generated. The enlarged coded image 8 can be pasted so that it does not overlap a character, a symbol, or a figure included in the image data. Even when the coded image 7 is enlarged, a form of the document is not largely changed. Even when the coded image 7 is enlarged, a part of the page is not moved to another page.

When shifting a position of a part other than the coded image 7, the controller 1 sets the area including the coded image 7 in the image data as the coded image area F0. The controller 1 sets the area above the coded image area F0 as the upper area F1. The controller 1 sets the area below the coded image area F0 as the lower area F2. The controller 1 sets the area on the left of the coded image area F0 as the left area F3. The controller 1 sets the area on the right of the coded image area F0 as the right area F4. The controller 1 shifts the upper area F1 upward, shifts the lower area F2 downward, shifts the left area F3 leftward, and shifts the right area F4 rightward. In this way, it is possible to generate a space for pasting the enlarged coded image 7 so that information in the image data is not lost.

When reducing a part other than the coded image 7, the controller 1 sets the area including the coded image 7 in the image data as the coded image area F0. The controller 1 sets the area above the coded image area F0 as the upper area F1. The controller 1 sets the area below the coded image area F0 as the lower area F2. The controller 1 sets the area on the left of the coded image area F0 as the left area F3. The controller 1 sets the area on the right of the coded image area F0 as the right area F4. The controller 1 reduces the upper area F1 and makes the upper side of the upper area F1 after reduction be identical to the upper side of the image data. The controller 1 reduces the lower area F2 and makes the lower side of the lower area F2 after reduction be identical to the lower side of the image data. The controller 1 reduces the left area F3 and makes the left side of the left area F3 after reduction be identical to the left side of the image data. The controller 1 reduces the right area F4 and makes the right side of the right area F4 after reduction be identical to the right side of the image data. In this way, it is possible to generate a space for pasting the enlarged coded image 7 so that information in the image data is not lost.

When performing the enlargement process, the controller 1 sets the enlargement ratio of the enlarged coded image 8 to the coded image 7 to be smaller as the resolution of printing based on the image data is higher. The controller 1 sets the enlargement ratio of the enlarged coded image 8 to the coded image 7 to be larger as the resolution of printing based on the image data is lower. It is possible to change the enlargement ratio of the coded image 7 in accordance with the resolution of printing. As the print resolution is lower, and as the coded image 7 is smaller, there are more cases where the coded image 7 cannot be read or analyzed. It is possible to enlarge the coded image 7 in accordance with the print resolution so that the coded image 7 can be quickly read and analyzed.

Although the embodiment of the present disclosure is described above, the scope of the present disclosure is not limited to this, and can be variously modified and implemented within the scope of the disclosure without deviating from the spirit thereof.

What is claimed is:

1. An image processing apparatus comprising:
   at least one of an image reader and a communication circuit for obtaining image data to be used for printing; and
   a controller for performing one or both of an enlargement process and a conversion process when a coded image in which information is coded is included in the image data, wherein
   the enlargement process is a process of pasting an enlarged coded image instead of the coded image on the image data, the enlarged coded image being obtained by enlarging the coded image,
   the conversion process is a process of pasting decoded information instead of the coded image, the decoded information being obtained by decoding the coded image,
   when performing the enlargement process, the controller shifts a position of a part other than the coded image in the image data or reduces a part other than the coded image, so as to secure an area for pasting the enlarged coded image,
   when shifting a position of a part other than the coded image,
   the controller sets an area including the coded image in the image data as a coded image area, sets an area above the coded image area as an upper area, sets an area below the coded image area as a lower area, sets an area on the left of the coded image area as a left area, and sets an area on the right of the coded image area as a right area, and
   the controller shifts the upper area upward, shifts the lower area downward, shifts the left area leftward, and shifts the right area rightward.

2. An image processing apparatus comprising:
   at least one of an image reader and a communication circuit for obtaining image data to be used for printing; and
   a controller for performing one or both of an enlargement process and a conversion process when a coded image in which information is coded is included in the image data, wherein
   the enlargement process is a process of pasting an enlarged coded image instead of the coded image on the image data, the enlarged coded image being obtained by enlarging the coded image,
   the conversion process is a process of pasting decoded information instead of the coded image, the decoded information being obtained by decoding the coded image,
   when performing the enlargement process, the controller shifts a position of a part other than the coded image in the image data or reduces a part other than the coded image, so as to secure an area for pasting the enlarged coded image,
   when reducing a part other than the coded image,
   the controller sets an area including the coded image in the image data as a coded image area, sets an area above the coded image area as an upper area, sets an area below the coded image area as a lower area, sets an area on the left of the coded image area as a left area, and sets an area on the right of the coded image area as a right area, and
   the controller reduces the upper area in such a manner that an upper side of the upper area after reduction is identical to an upper side of the image data, reduces the lower area in such a manner that a lower side of the lower area after reduction is identical to a lower side of the image data, reduces the left area in such a manner that a left side of the left area after reduction is identical to a left side of the image data, and reduces the right area in such a manner that a right side of the right area after reduction is identical to a right side of the image data.

* * * * *